United States Patent [19]
Takiguchi

[11] Patent Number: 5,857,935
[45] Date of Patent: Jan. 12, 1999

[54] UPSHIFT CONTROL DEVICE FOR AUTOMATIC TRANSMISSION

[75] Inventor: Masahiro Takiguchi, Fuji, Japan

[73] Assignee: Jatco Corporation, Japan

[21] Appl. No.: 900,150

[22] Filed: Jul. 28, 1997

[30] Foreign Application Priority Data

Jul. 31, 1996 [JP] Japan ................................. 8-202236

[51] Int. Cl.⁶ ................................................ F16H 61/08
[52] U.S. Cl. .......................................... 475/120; 475/129
[58] Field of Search ................................ 477/151, 152; 475/120, 129

[56] References Cited

U.S. PATENT DOCUMENTS 3,942,393  3/1976  Forster et al. .......................... 475/120
3,956,947  5/1976  Leising et al. .......................... 475/120

*Primary Examiner*—Dirk Wright
*Attorney, Agent, or Firm*—Rossi & Associates

[57] ABSTRACT

An upshift control device for an automatic transmission is provided in which the transmission is shifted up by releasing an oil pressure from a first engaging element that has been engaged while applying an oil pressure to a second engaging element that has been released. This upshift control device includes engine racing detecting means for detecting racing of an engine of the vehicle during upshifting, and engine racing preventive control mans for generating to an actuator of a timing valve a command to temporarily apply a pressure to a back pressure chamber of a first accumulator which is provided in an oil path leading to the first engaging element and from which the pressure has been released, when racing of the engine is detected after the upshift command is generated.

4 Claims, 7 Drawing Sheets

| | REV/C | HIGH/C | 2-4/B | LOW/C | L&R/B | LOW O.W.C |
|---|---|---|---|---|---|---|
| 1st | | | | ○ | ◌ | ◎ |
| 2nd | | | ○ | ○ | | |
| 3rd | | ○ | | ○ | | |
| 4th | | ○ | ○ | | | |
| Rev | ○ | | | | ○ | |

| SOLENOID<br>GEAR POSITION | SHIFT SOLENOID A | SHIFT SOLENOID B |
|---|---|---|
| 1st | ○ | ○ |
| 2nd | × | ○ |
| 3rd | × | × |
| 4th | ○ | × |

○ ··· ON (DRAIN CLOSED)
× ··· OFF (DRAIN OPEN)

UPSHIFT CONTROL DEVICE FOR AUTOMATIC TRANSMISSION

BACKGROUND OF THE INVENTION

1. Field of the Invention

The present invention relates to an upshift control device for an automatic transmission of a motor vehicle, and more particularly to a technique for controlling a back pressure of an accumulator of an engaging element to be released during upshifting.

2. Description of the Prior Art

There is known a shift control device for an automatic transmission as disclosed in Japanese laid-open Patent Publication No. 5-248526. When the transmission is shifted up from its 3rd-speed gear position to 4th-speed gear position, racing of the engine may occur or the torque of the output shaft of the transmission may be suddenly reduced if the released pressure of a low clutch 50 to be released inappropriately overlaps the applied pressure of the a band brake 28 to be engaged. In view of this problem, the shift control device disclosed in the above-identified publication is provided with a low clutch sequence valve 90 that is switched from a supply position for applying a pressure to a low clutch accumulator 83 of the low clutch 50 to a drain position for draining the accumulator 83, when a difference between the accumulator back pressure and the 4th-speed engaging pressure as operating signal pressures becomes equal to a predetermined value, so that the released pressure and the applied pressure are controlled to the same level in appropriate timing.

If the low clutch sequence valve 90 of the known shift control device as described above is tuned to be switched at a point of time when interlocking occurs, namely, when the applied pressure and released pressure overlap each other, the torque of the output shaft of the transmission is pulled down or drops to a large depth in the initial period of inertia phase, resulting in increased shocks, as shown in FIG. 9.

If the low clutch sequence valve 90 is tuned to be switched at a point of time when the applied pressure and the released pressure hardly overlap each other, so as to alleviate pull-down of the torque of the output shaft and thus reduce shocks, on the other hand, racing of the engine would occur due to an insufficient engaging capacity before or after the start of the inertial phase. In order to prevent racing of the engine while at the same time reducing shocks, therefore, the low clutch sequence valve 90 needs to be switched just before the engine starts racing.

Where the low clutch sequence valve is tuned to be switched at a point of time just before the engine starts racing as shown in FIG. 10, however, racing of the engine may occur since the applied pressure, released pressure and torque of the output shaft vary depending upon shift conditions. In view of this, the sequence valve is actually tuned so that the hydraulic capacity of the engaging elements is closer to the interlocking condition. In this case, however, the torque of the output shaft may be pulled down deeply or the engine suffers from racing due to variations in the oil pressure or the output torque.

SUMMARY OF THE INVENTION

It is therefore a first object of the present invention to provide an upshift control device for an automatic transmission wherein the transmission is shifted up to a gear position to be established after upshifting, by releasing an oil pressure from a first engaging element that has been engaged while applying an oil pressure to a second engaging element that has been released, which control device is able to effectively prevent racing of the engine during the upshifting by increasing the pressure of an accumulator of the first engaging element immediately after detection of the engine racing.

It is a second object of the invention to increase the degree of freedom in tuning the timing of switching of the sequence valve, while assuring the effect of preventing the racing of the engine.

It is a third object of the invention to surely prevent the racing of the engine during upshifting, by increasing the back pressure of the accumulator of the first engaging element, irrespective of whether the sequence valve has been switched to its drain position or not.

It is a fourth object of the invention to provide an upshift control device as described above, which is able to immediately detect racing of the engine.

To accomplish the first object, there is provided according to the present invention an upshift control device for an automatic transmission as shown in FIG. 1, wherein the transmission is shifted up to a first gear position to be established after upshifting, by releasing an oil pressure from a first engaging element "a" that has been engaged in a second gear position established before upshifting while applying an oil pressure to a second engaging element "b" that has been released in the second gear position, the upshift control device comprising: a first accumulator "c" provided in a oil path leading to the first engaging element "a" that is to be released upon completion of upshifting; an accumulator control valve "d" for producing an oil pressure to be applied to a back pressure chamber of the first accumulator "c"; a timing valve "k" that is switched between a position to allow the oil pressure to be supplied to the back pressure chamber of the first accumulator, and a position to remove the oil pressure from the back pressure chamber; upshift determining means "e" for determining whether an upshift command to shift up the transmission is generated; engine racing detecting means "f" for detecting racing of an engine of the vehicle during upshifting; and engine racing preventive control mans "h" for generating to an actuator "m" of the timing valve "k" a command to temporarily supply the oil pressure to the back pressure chamber of the first accumulator from which the pressure has been released, when the engine racing detecting means "f" detects racing of the engine after the upshift command is generated.

The operation of the upshift control device constructed as described above will be now descried. If the engine racing detecting means "f" detects racing of the engine after the upshift determining means "e" determines that an upshift command to shift up the transmission is generated during running of the vehicle, the engine racing preventive control means "h" generates to the actuator "m" of the timing valve "k" a command to supply a back pressure to the back pressure chamber of the first accumulator "c" from which the back pressure has been released.

Accordingly, where the released pressure of the first engaging element "a" is reduced in an early stage of upshifting, and racing of the engine occurs due to an insufficient engaging capacity, an oil pressure is temporarily supplied to the back pressure of the first accumulator "c" which is provided in the oil path leading to the first engaging element "a" and from which the back pressure has been released. In response to the supply of the accumulator back pressure, the engaging pressure of the first engaging element "a" is increased, to provide a sufficient engaging capacity on the side of the first engaging element "a", thereby to suppress the racing of the engine to a sufficiently small level.

To accomplish the second object, the upshift control device as described above may further comprise a second accumulator "i" provided in an oil path leading to the second engaging element "b" that is to be engaged upon completion of upshifting, and a sequence valve "j" provided between the first accumulator "c" and the accumulator control valve "d", the sequence valve being switched from a supply position for supplying the oil pressure to the back pressure chamber of the first accumulator "c", to a drain position for draining the back pressure chamber when a difference between a pressure of the first or second accumulator and a pressure to be applied to the second engaging element as operating signal pressures becomes equal to a predetermined value. In this control device, the timing valve "k" is switched between a first position in which the pressure to be applied to the second engaging element "b" is applied as an operating signal pressure to the sequence valve "j", and a second position in which the pressure to be applied to the second engaging element "b" is inhibited from being applied to the sequence valve.

The operation of the above-described upshift control device will be described. While the pressure to be applied to the second engaging element "b is being increased during upshifting, the sequence valve "j" is placed in the supply position for supplying the back pressure to the first accumulator "c" until a difference between the back pressure of the first or second accumulator and the applied pressure of the second engaging element "b" becomes equal to a predetermined value, so that the oil pressure produced by the accumulator control valve "d" is applied to the back pressure chamber of the first accumulator "c".

When the difference between the back pressure of the first or second accumulator and the applied pressure of the second engaging element "b" becomes equal to the predetermined value due to the increase in the pressure applied to the second engaging element "b", the sequence valve "j" is switched to a drain position in which the back pressure of the first accumulator "c" is released, thereby to drain the first accumulator "c". As a result, the oil pressure in the back pressure chamber of the first accumulator "c" is rapidly lowered with a result of a sudden decrease in the released pressure of the first engaging element "a", thereby to prevent interlocking caused by overlapping of the applied pressure and released pressure, and reduce the drop of the torque of the output shaft in the initial period of inertia phase.

If racing of the engine occurs after switching of the sequence valve "j", the timing valve "k" is switched in response to a command from the engine racing preventive control means "h", from the position in which the pressure to be applied to the second engaging element "b" is applied to the sequence valve "j" to the position in which the applied pressure is inhibited from being applied to the sequence valve "j". As a result, only the accumulator back pressure is applied as an operating signal pressure to the sequence valve "j", and the sequence valve "j" is temporarily switched again to the position for supplying the back pressure to the first accumulator "c". With the oil pressure thus temporarily supplied to the back pressure chamber of the first accumulator "c", the engaging capacity of the first engaging element "a" is temporarily increased, thereby to prevent racing of the engine.

In this arrangement, the timing of switching the sequence valve "j" may be tuned with an increased degree of freedom, only taking account of reduction of shocks, since the control for preventing the racing of the engine can be achieved by temporarily increasing the pressure to be released from first engaging element. Where the sequence valve "j" is tuned to be switched at a point of time a little closer to the time of interlocking, the racing of the engine which would occur due to variations in the oil pressure or the torque of the output shaft can be prevented. Where the sequence valve "j" is tuned to be switched just before the engine starts racing, the control device is able to prevent racing of the engine while reducing shocks.

The third object may be accomplished by providing the upshift control device as described just above, wherein the engine racing preventive control means "h" generates to a valve actuator "g" of the accumulator control valve "d" a command to temporarily increase the pressure in the back pressure chamber of the first accumulator "c", and generates to an actuator "m" of the timing valve "k" a command to temporarily supply the oil pressure to the back pressure chamber of the first accumulator "c", when the engine racing detecting means detects racing of the engine after the upshift command is generated.

The operation will be described. In the above-described upshift control device provided for attaining the first object, the control for preventing racing of the engine is accomplished by temporarily supplying the pressure to the back pressure chamber of the first accumulator "c" from which the back pressure has been released. This means that the racing of the engine can be prevented in this manner only after switching of the sequence valve "j" from which the back pressure has been released. In order to prevent racing of the engine when it occurs before switching of the sequence valve "j", namely, while the back pressure is being supplied to the first accumulator "c", the back pressure of the first accumulator "c" is temporarily increased, thereby to temporarily increase the engaging capacity of the first engaging element "a" to achieve the control of preventing the racing of the engine.

The upshift control device provided for attaining the third object is adapted to perform two kinds of control operations for preventing racing of the engine, namely, control for temporarily supplying the accumulator back pressure that has been released, and control for increasing the accumulator back pressure that has been supplied. Thus, the racing of the engine can be prevented irrespective of whether it occurs before or after switching the sequence valve "j".

The above two kinds of control operations may be concurrently performed upon occurrence of racing of the engine, without detecting switching of the sequence valve "j", since the sequence valve "j" is switched to the drain side based on the back pressure of the accumulator. Thus, the two kinds of controls do not interference with each other, causing no shocks due to the interference. It is, however, possible to detect switching of the sequence valve "j", and perform the control for temporarily increasing the accumulator back pressure before switching, and the control for temporarily supplying the accumulator back pressure after switching.

The fourth object may be accomplished by providing the upshift control device as described above, wherein the engine racing detecting means "f" detects racing of the engine when a gear ratio of the automatic transmission which is occasionally calculated during upshifting becomes larger than an initial gear ratio established when the upshift command is generated.

In the upshift control device as described above, the gear ratio is occasionally obtained during upshifting, by calculating the ratio of the rotating speed of the input shaft of the transmission to the rotating speed of the output shaft of the transmission. It is to be noted that the gear ratio of the gear position established before upshifting is maintained in the initial period of upshifting, and then reduced down to that of the gear position to be established after upshifting, as long as racing of the engine does not occur during upshifting. Accordingly, the racing of the engine can be detected immediately after it occurs, when the gear ratio that is occasionally calculated during upshifting is increased even a slight amount, thereby assuring the effect of the control for preventing the racing of the engine.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENTS

One preferred embodiment of the present invention in the form of an upshift control device for an automatic transmission will be hereinafter described.

First, there will be schematically described the whole construction of the automatic transmission in which the upshift control device of the present embodiment is employed.

Figure 1:
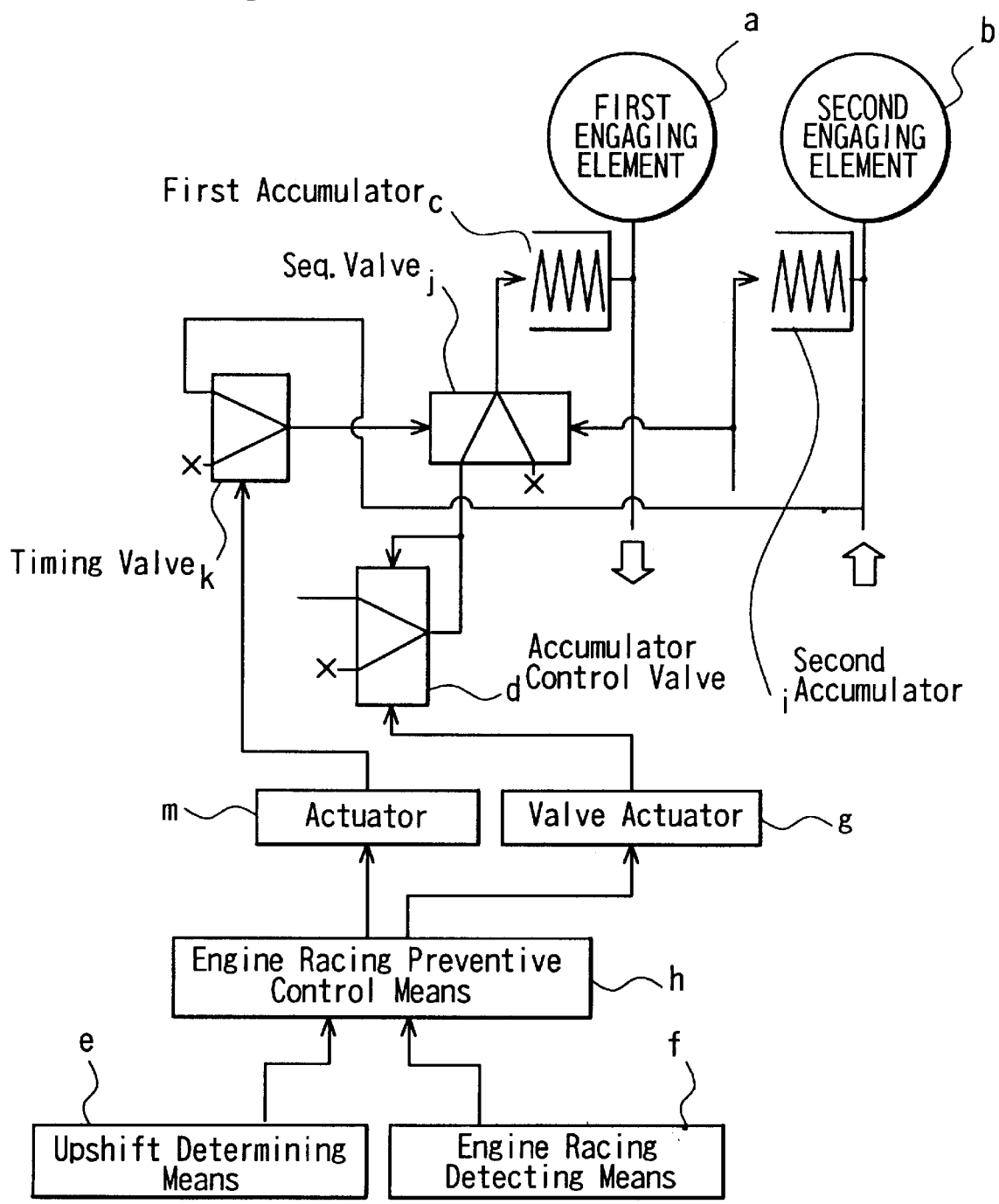
FIG. 1 is a view showing the construction of an upshift control device for an automatic transmission according to the present invention.
Figures 2, 3:
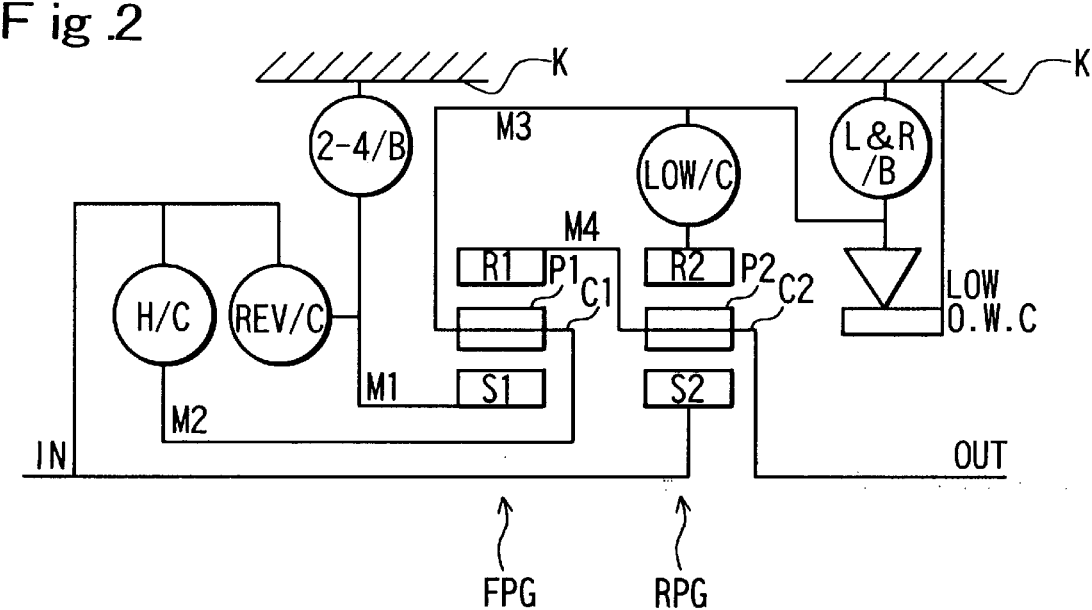
FIG. 2 is a view schematically showing a power transmitting system of the automatic transmission using the hydraulic control device of the first embodiment of the invention.
FIG. 3 is a table showing engaging states of elements of the automatic transmission using the hydraulic control device of the first embodiment.

FIG. 2 is a view schematically showing a power transmitting system of the automatic transmission. In FIG. 2, IN is an input shaft, and OUT is an output shaft, while FPG is a front planetary gear system, and RPG is a rear planetary gear system. The front planetary gear system FPG includes a first sun gear S1, a first ring gear R1, a first pinion P1 and a first pinion carrier C1. The rear planetary gear system RPG includes a second sun gear S2, a second ring gear R2, a second pinion P2 and a second pinion carrier C2.

Engaging elements for establishing forward 4-speed, reverse 1-speed gear positions by using the above-described gear train arrangement are provided which include a reverse clutch REV/C (hereinafter referred to as R/C), high clutch HIGH/C (hereinafter referred to as H/C), 2-4 brake 2-4/B, low clutch LOW/C (hereinafter referred to as L/C), low & reverse brake L&R/B, and low one-way clutch LOW O.W.C.

The first sun gear S1 is connected to the input shaft IN through a first rotary member M1 and the reverse clutch R/C, and also connected to a case K through the first rotary member M1 and the 2-4 brake 2-4/B.

The first carrier C1 is connected to the input shaft IN through a second rotary member M2 and the high clutch H/C, and also connected to the case K through a third rotary member M3 and the low&reverse brake L&R/B. Further, the first carrier C1 is connected to the second ring gear R2 through the third rotary member M3 and the low clutch L/C. The low one-way clutch LOW O.W.C. is disposed in series with the low&reverse brake L&R/B.

The first ring gear R1 is directly connected to the second carrier C2 through a fourth rotary member M4, and the output shaft OUT is directly connected to the second carrier C2. The second sun gear S2 is directly connected to the input shaft IN.

This power transmitting system is characterized in that it does not include a one-way clutch for controlling the shift timing so as to eliminate shift shocks upon shifting-down from the 4th-speed to 3rd-speed gear position, and a clutch that is hydraulically engaged and needed for ensuring the effect of engine brakes when the above one-way clutch is employed. Thus, the number of engaging elements is reduced, leading to reduced size and weight of the power transmitting system.

FIG. 3 is a view showing engaged and unengaged states of the engaging elements of the above-described power transmitting system for establishing the forward 4-speed, reverse 1-speed gear positions.

The 1st-speed gear position is established by hydraulically engaging the low clutch L/C, and hydraulically engaging the low&reverse brake L&R/B (when an engine brake range is selected) or mechanically engaging the low one-way clutch LOW O.W.C. (when the vehicle is accelerated). In this case, the second sun gear S2 is connected to the input shaft IN, and the second ring gear R2 is fixed, while the second carrier C2 is connected to the output shaft OUT.

The 2nd-speed gear position is established by hydraulically engaging the low clutch L/C and the 2-4 brake 2-4/B. In this case, the second sun gear S2 is connected to the input shaft IN, and the first sun gear S1 is fixed, while the second carrier C2 is connected to the output shaft OUT.

The 3rd-speed gear position is established by hydraulically engaging the high clutch H/C and the low clutch L/C. In this case, the second ring gear R2 and second sun gear S2 are concurrently connected to the input shaft IN, and the second carrier C2 is connected to the output shaft OUT, so that the transmission gear ratio becomes equal to 1.

The 4th-speed gear position is established by hydraulically engaging the high clutch H/C and the 2-4 brake 2-4/B. In this case, the first carrier C1 and second sun gear S2 are connected to the input shaft IN, and the first sun gear S1 is fixed, while the second carrier C2 is connected to the output shaft OUT, so as to establish the overdrive gear position.

The reverse gear position is established by hydraulically engaging the reverse clutch REV/C and the low&reverse brake L&R/B. In this case, the first and second sun gears S1, S2 are connected to the input shaft IN, and the first carrier C1 is fixed, while the second carrier C2 is connected to the output shaft OUT.

The 2-4 brake 2-4/B is a multiple-disc brake that is constructed similarly to a multiple-disc clutch.

Figure 4:
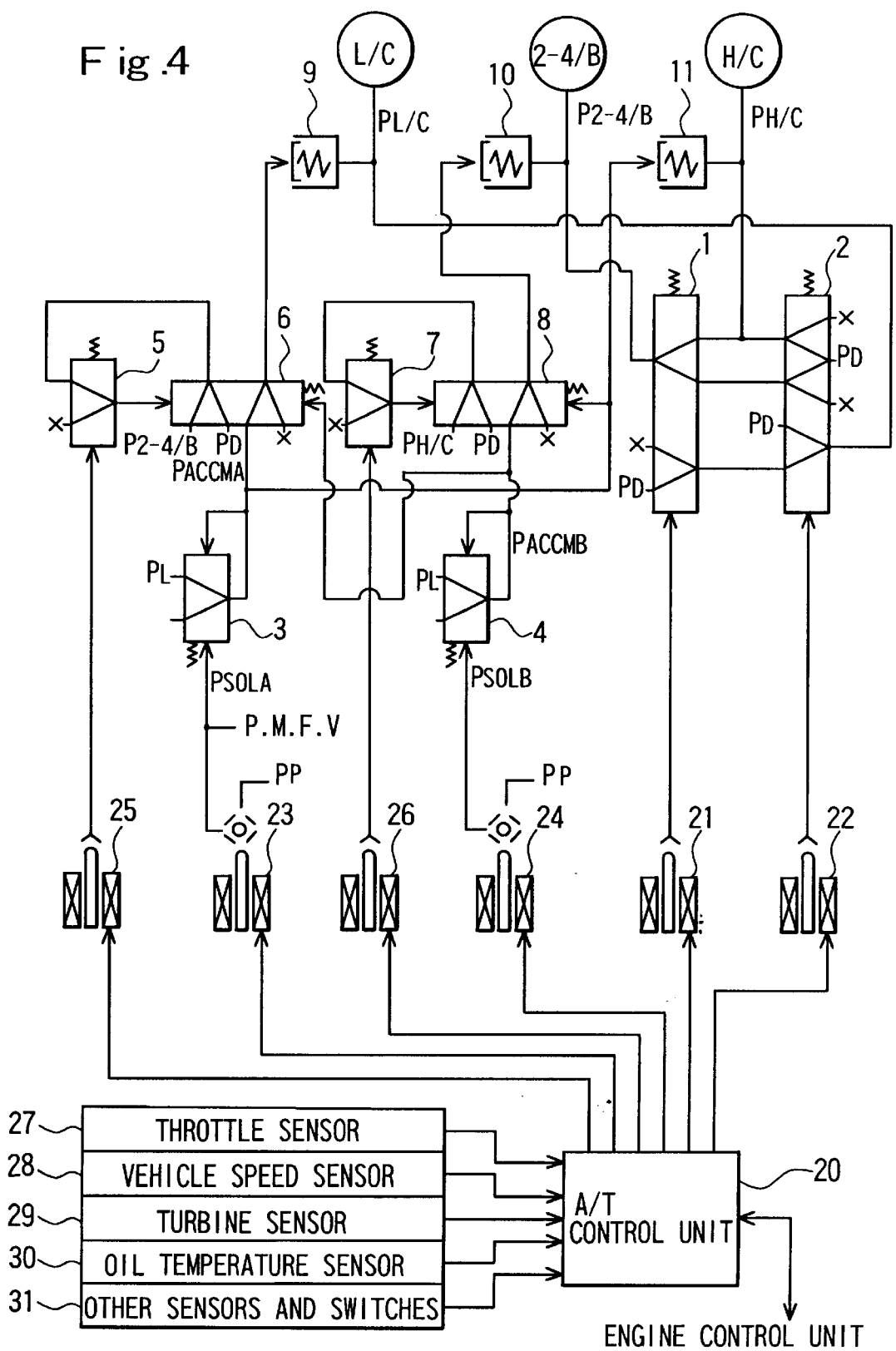
FIG. 4 is a diagram showing the whole control system including a hydraulic control portion and an electronic control portion of the upshift control device of the first embodiment.

FIG. 4 is a control system diagram showing a control valve portion, an electronic control portion, and engaging elements for automatically shifting the transmission to establish one of the above-indicated 1st-speed to 4th-speed gear positions in the D (drive) range. In FIG. 4, the low clutch L/C, 2-4 brake 2-4/B and high clutch H/C are provided as the engaging elements.

In the control valve portion of FIG. 4, there are provided a shift valve (A) 1, shift valve (B) 2, accumulator control valve (A) 3, accumulator control valve (B) 4, low clutch timing valve 5, low clutch sequence valve 6, 2-4 brake timing valve 7, 2-4 brake sequence valve 8, low clutch accumulator 9, 2-4 brake accumulator 10 and high clutch accumulator 11.

The shift valve (A) 1 and shift valve (B) 2 are adapted to switch oil paths to establish each of the 1st-speed to 4th-speed (overdrive) gear positions according to the operations of a shift solenoid (A) 21 and a shift solenoid (B), respectively.

The accumulator control valve (A) 3 reduces a line pressure P$_L$ depending upon the level of a solenoid pressure P$_{SOLA}$ produced by a line pressure duty solenoid 23, so as to produce an accumulator control pressure (A) P$_{ACCMA}$. The solenoid pressure P$_{SOLA}$ produced by the line pressure duty solenoid 23 is also led to a pressure modifier valve adapted to produce a modifier pressure that serves as a signal pressure for the line pressure P$_L$ produced by a pressure regulator valve (not shown).

The accumulator control valve (B) 4 reduces the line pressure P$_L$ depending upon the level of a solenoid pressure P$_{SOLB}$ produced by a 2-4/B duty solenoid 24, so as to produce an accumulator control pressure (B) P$_{ACCMB}$.

The low clutch timing valve 5 is a switch valve that drains a signal pressure oil path when a low clutch timing solenoid 25 is OFF, and produces an oil pressure for communication of the signal pressure oil path when the solenoid 25 is ON. The low clutch sequence valve 6 is adapted to control the back pressure of the low clutch accumulator 9 upon shifting-up to the 4th-speed gear position or shifting-down from the 4th-speed gear position.

The 2-4 brake timing valve 7 is a switch valve that drains a signal pressure oil path when a 2-4 brake timing solenoid 26 is OFF, and produces an oil pressure for communication of the signal pressure oil path when the solenoid 26 is ON. The 2-4 brake sequence valve 8 is adapted to control the back pressure of the 2-4 brake accumulator 10 upon shifting-up to the 3rd-speed gear position or shifting-down from the 3rd-speed gear position.

The low clutch accumulator 9 has a back pressure chamber to which the accumulator control pressure (A) P$_{ACCMA}$ is applied through the low clutch sequence valve 6, so as to smoothly engage and release the low clutch L/C. The 2-4 brake accumulator 10 has a back pressure chamber to which the accumulator control pressure (B) P$_{ACCMB}$ is applied through the 2-4 brake sequence valve 8, so as to smoothly engage and release the 2-4 brake 2-4/B. The high clutch accumulator 11 has a back pressure chamber to which the accumulator control pressure (A) P$_{ACCMA}$ is directly applied, so as to smoothly engage and release the high clutch H/C.

The electronic control portion of FIG. 4 includes shift solenoid (A) 21, shift solenoid (B) 22, line pressure duty solenoid 23, 2-4/B duty solenoid 24, low clutch timing solenoid 25 and 2-4/B timing solenoid 26, as actuators for controlling oil pressures according to drive commands generated by an A/T control unit 20.

The A/T control unit 20 receives as input information various signals from various sensors, such as a throttle sensor 27 for detecting the throttle opening of a throttle valve, a vehicle speed sensor 28 for detecting the vehicle speed, a turbine sensor 29 for detecting the rotating speed of a turbine runner, oil temperature sensor 30 for detecting the oil temperature, and other sensors and switches 31.

Figures 5, 6:
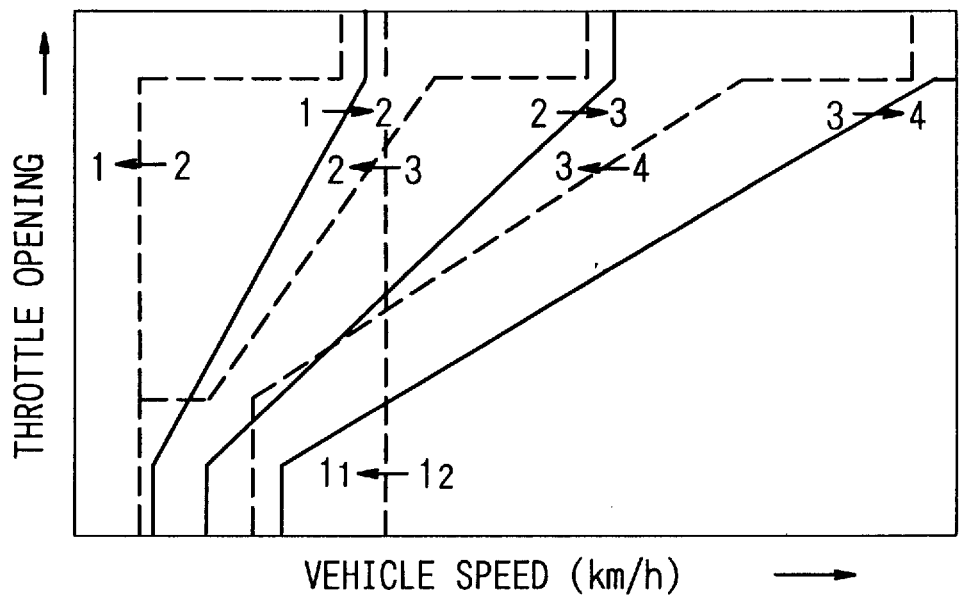
FIG. 5 is a table showing operated states of shift solenoids of the hydraulic control device of the first embodiment.
FIG. 6 is a graph showing one example of gear change point characteristics employed by the hydraulic control device of the first embodiment.

To perform shift control for automatically shifting the transmission from one of the 1st-speed to 4th-speed gear positions to another in the D (drive) range, a gear change command is first enerated based on the graph of FIG. 6 indicating gear change points in relation to the detected throttle opening and vehicle speed, when the current point (relationship between the throttle opening and vehicle speed) on the graph passes one of upshifting and downshifting lines, and the gear position to which the transmission should be shifted is determined by this gear change command. To establish the thus determined gear position, the A/T control unit 20 generates ON- or OFF-command to each of the shift solenoid (A) 21 and shift solenoid (B) 22 according to the table of FIG. 5 indicating operated states of the shift solenoids.

There will be next explained the operation of the present embodiment.

Electronic Control Operation upon 2-3 Upshifting

Figure 7:
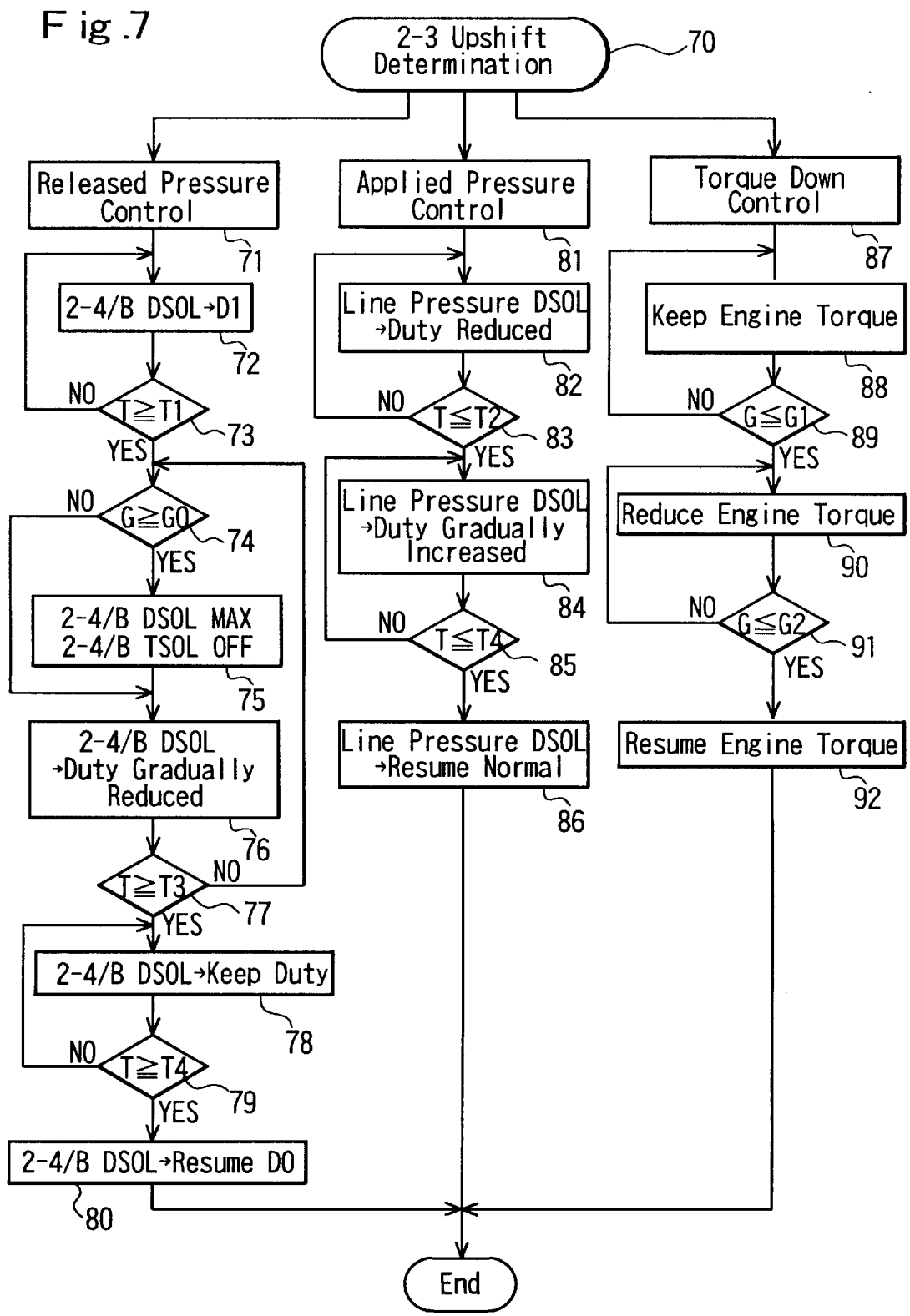
FIG. 7 is a flow chart showing the flow of 2nd-speed to 3rd-speed upshift control performed by an A/T control unit of the first embodiment.

FIG. 7 is a flow chart showing the flow of the upshift control performed by the A/T control unit 20 when the transmission is shifted up from the 2nd-speed to 3rd-speed gear position, in which control the 2-4 brake 2-4/B (corresponding to the first engaging element "a") is released and the high clutch H/C (corresponding to the second engaging element "b") is engaged.

Initially, in step 70 of FIG. 7, it is determined whether the transmission is to be shifted up from the 2nd-speed to 3rd-speed gear position. An affirmative decision (YES) is obtained in this step when the current point (relationship between the throttle opening and the vehicle speed) on the graph of FIG. 6 indicating gear change points passes a 2-3 upshifting line, and a 2-3 upshift command is generated. (This step corresponds to upshift determining means "e".) When it is determined that the 2-3 upshift command is generated, a timer value T representing the time elapsed after generation of the 2-3 upshift command starts being increased, and required input information, such as a throttle opening TH, is read in. Also, arithmetic processing is occasionally performed to determine the actual or current gear ratio G that is the ratio of the turbine speed detected by the turbine sensor 29 (rotating speed of the input shaft of the transmission) to the vehicle speed detected by the vehicle speed sensor 28 (rotating speed of the output shaft of the transmission).

When it is determined that the 2-3 upshift command is generated, an OFF command is kept being generated to the shift solenoid (A) 21, and a command to the shift solenoid (B) 22 is switched from ON to OFF. Following the generation of the 2-3 upshift command in step 70, (1) released pressure control (steps 71–80), (2) applied pressure control (steps 81–86) and (3) torque down control (steps 87–92) are implemented independently of each other.

(1) Released Pressure Control

In step 72, a command is generated to drive the 2-4/B duty solenoid 24 (corresponding to valve actuator "g") with duty ratio D1 (that is smaller than D0; initial duty ratio). In step 73, it is determined whether the timer value T is equal to or larger than a first predetermined timer value T1. The first predetermined timer value T1 is set to be a sufficiently short period of time required for the released pressure to reach a steady-state level to provide a shelf pressure, as counted from the time when the upshift command is generated.

In step 74, it is determined whether the actual gear ratio G represented by a count value is equal to or larger than a threshold value G0 set for determining racing of the engine, which value is obtained by adding 1 count value to the count value of the 2nd-speed gear ratio. This step corresponds to engine racing detecting means "f". If an affirmative decision (YES) is obtained in step 74, step 75 is executed to generate a command to drive the 2-4/B duty solenoid 24 with 100% duty ratio (maximum duty ratio) for a predetermined time "t", and at the same time generate an OFF command to the 2-4/B timing solenoid 26 (corresponding to actuator "m") for the predetermined time "t". This step corresponds to engine racing preventive control means "h".

Step 76 is then executed to generate a command to gradually or slowly reduce the duty ratio of the 2-4/B duty solenoid 24 with a lapse of time. In step 77, it is determined whether the timer value T is equal to or larger than a third predetermined timer value T3. The third predetermined timer value T3 is set to a period of time from generation of the upshift command to completion of the inertia phase. In this step 77, it may be determined whether the actual gear ratio G is equal to or smaller than a second predetermined gear ratio G2 (gear ratio indicating the completion of the inertia phase).

Step 78 is then executed to generate a command to keep operating the 2-4/B duty solenoid 24 with the reduced duty ratio. In step 79, it is determined whether the timer value T is equal to or larger than a timer value T4 that represents completion of the shift operation. If an affirmative decision (YES) is obtained in step 79, step 80 is executed to generate a command to resume driving of the 2-4/B duty solenoid 24 with the initial duty ratio D0 that was employed upon the start of the shift operation.

(2) Applied Pressure Control

In step 82, a command is generated to drive the line pressure duty solenoid 23 with a relatively low duty ratio. In step 83, it is determined whether the timer value T is equal to or larger than a second predetermined timer value T2. The second predetermined timer value T2 is set to a value around the time of switching the 2-4 brake sequence valve 8 (corresponding to the sequence valve "j"). If an affirmative decision (YES) is obtained in step 83, step 84 is then executed to gradually increase the duty ratio of the line pressure duty solenoid 23 at a predetermined slope.

In step 85, it is determined whether the timer value T is equal to or larger than the timer value T4 that represents completion of the shift operation. If an affirmative decision (YES) is obtained in step 85, step 86 is then executed to resume normal control in which a command based on the degree of the throttle opening TH is given to the line pressure duty solenoid 23.

(3) Torque Down Control

In step 88, the engine torque is kept at substantially the same level. In step 89, it is determined whether the actual gear ratio G is equal to or smaller than a first predetermined gear ratio G1. If an affirmative decision (YES) is obtained in step 89, step 90 is executed to generate a command to reduce the engine torque. Where the torque down control is effected by controlling the opening angle of the throttle valve, the engine torque is reduced by fully closing the throttle valve, for example. Where the torque down control is effected by cutting the fuel, the engine toque is reduced by cutting the fuel in all or a predetermined number of cylinders of the engine.

In step 91, it is determined whether the actual gear ratio G is equal to or smaller than a third predetermined gear ratio G3. The third predetermined gear ratio G3 (<G2) is set to a value that is extremely close to the gear ratio established in the 3rd-speed gear position after shifting, at which ratio the inertia phase is about to be completed. If an affirmative decision (YES) is obtained in step 91, a command to resume the engine torque to a normal level is generated.

During the shift-up operation as described above, an ON command is kept generated to the low clutch timing solenoid 25.

2-3 Upshift Control Operation

Figure 8:
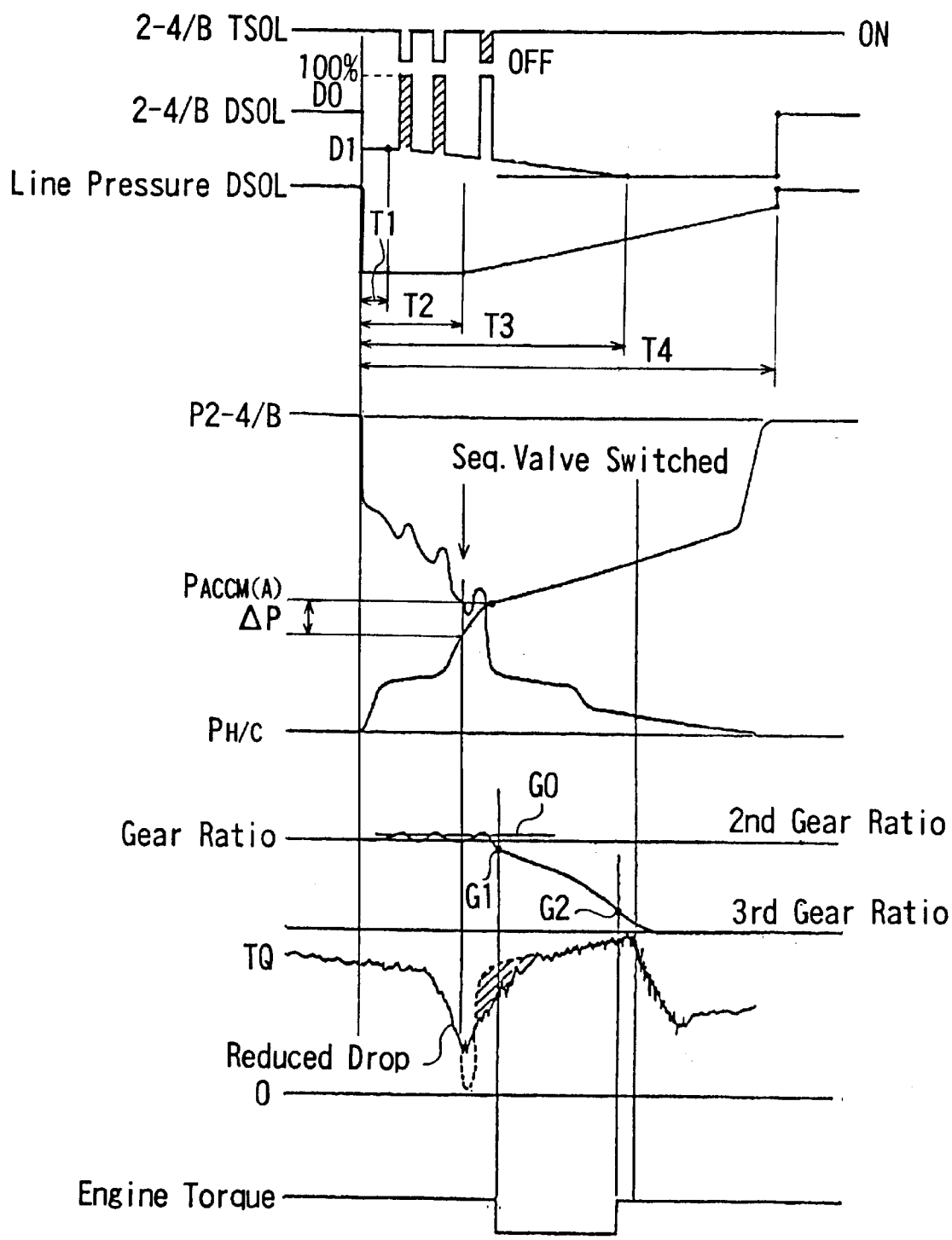
FIG. 8 is a time chart showing respective transient characteristics of control commands, oil pressure, gear ratio, output shaft torque and others during the 2nd-speed to 3rd-speed shift-up operation in the first embodiment.
Figure 9:
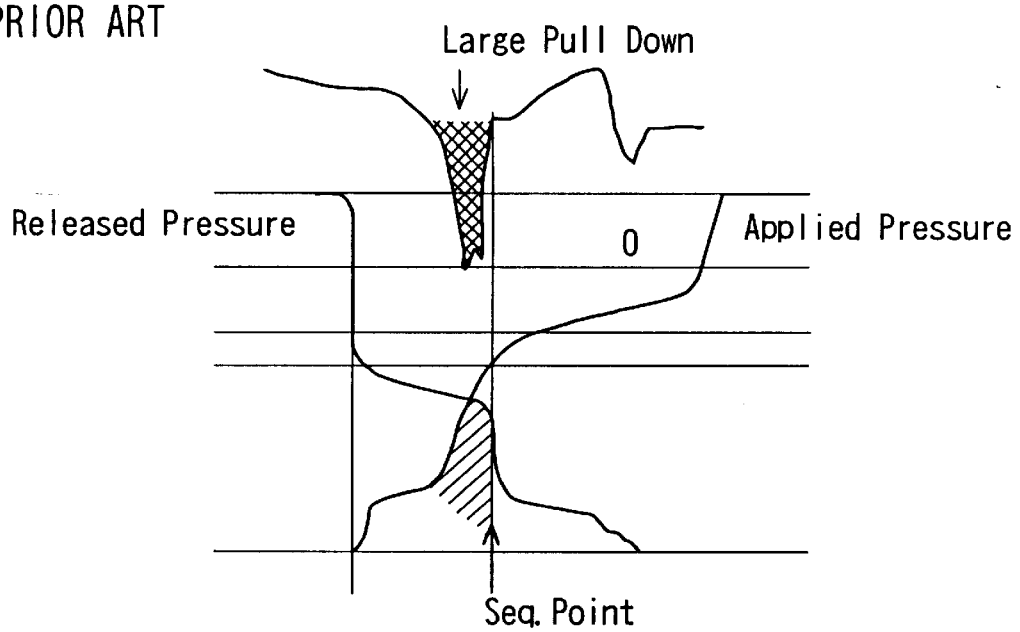
FIG. 9 is a time chart showing respective transient characteristics of output shaft torque, turbine speed, applied pressure and released pressure during a 2nd-speed to 3rd-speed shift-up operation in a conventional device in which a sequence valve is tuned to be switched at a point of time close to the time of interlocking.
Figure 10:
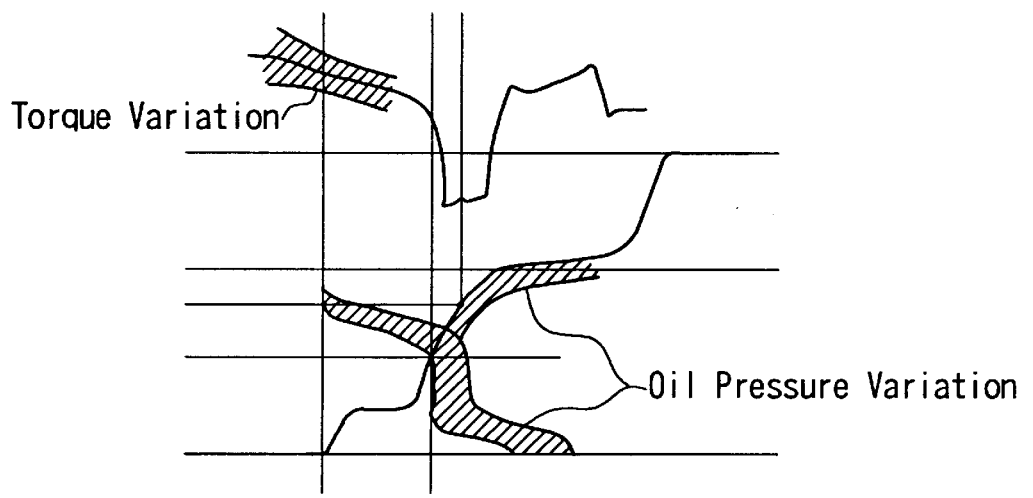
FIG. 10 is a time chart showing respective transient characteristics of output shaft torque, turbine speed, applied pressure and released pressure during a 2nd-speed to 3rd-speed shift-up operation in a conventional device in which the sequence valve is tuned to be switched at a point of time immediate before the start of racing of the engine.

Referring to the time chart of FIG. 8, a 2-3 upshift control operation with a medium to large degree of throttle opening will be now explained.

If a 2-3 upshift command is generated due to an increase of the vehicle speed during running of the vehicle with the accelerator pedal being depressed, a command to the shift solenoid (B) 22 is switched from ON to OFF, so as to supply a D (drive) range pressure to the oil path to the high clutch H/C which has been drained, while draining the oil path to the 2-4 brake 2-4/B to which the D (drive) range pressure has been supplied.

The pressure released from the 2-4 brake 2-4/B is controlled during the shift operation, by controlling the back pressure of the 2-4 brake accumulator 10 (corresponding to first accumulator "c") provided in an oil path leading to the 2-4 brake 2-4/B, and the pressure applied to the high clutch H/C is controlled during the shift operation, by controlling the back pressure of the high clutch accumulator 11 (corresponding to second accumulator "i") provided in an oil path leading to the high clutch H/C. The torque down control during shifting is effected by generating a control command from the A/T control unit 20 to an engine control unit.

(1) Released Pressure Control

Upon 2nd-speed to 3rd-speed upshifting, an ON command is generated to the 2-4/B timing solenoid 26, so that the 2-4/B timing valve 7 (corresponding to timing valve "k") is switched to a position for applying the high clutch pressure $P_{H/C}$ as an operating signal pressure to the 2-4/B brake sequence valve 8. With the 2-4/B timing valve 7 thus switched, the 2-4 brake sequence valve 8 (corresponding to sequence valve "j") is placed in a position in which the accumulator control pressure (B) $P_{ACCMB}$ produced by the accumulator control valve (B) 4 (corresponding to accumulator control valve "d") is supplied to the 2-4 brake accumulator 10 until a difference ΔP between the accumulator control pressure (A) $P_{ACCMA}$ and the high clutch pressure $P_{H/C}$ becomes equal to a predetermined value.

If racing of the engine occurs while the 2-4 brake sequence valve 8 is placed in the above position before it is switched, the engine racing is determined in the initial period by detecting an increase in the gear ratio, and a command to drive the 2-4/B duty solenoid 24 with 100% duty ratio is generated for the above-indicated predetermined time "t" based on this detection. As a result, an oil pressure applied to a back pressure chamber of the 2-4 brake accumulator 10 is temporarily increased, and the released pressure of the 2-4 brake 2-4/B is thus increased to bring the brake 2-4/B into an interlocked state, thereby to prevent the engine from excessively racing. Although an OFF command is generated to the 2-4/B timing solenoid 26 for the predetermined time "t" upon detection of the racing of the engine, to temporarily drain the high clutch pressure $P_{H/C}$, the 2-4 brake sequence valve 8 is kept in the position for supplying the accumulator back pressure, and the above control for preventing engine racing by increasing the back pressure of the 2-4 brake accumulator 10 will not be affected by draining of the high clutch pressure $P_{H/C}$.

When the high clutch pressure $P_{H/C}$ increases until the difference ΔP between the accumulator control pressure (A) $P_{ACCMA}$ that is applied to the 2-4 brake sequence valve 8 and high clutch pressure $P_{H/C}$ becomes equal to a predetermined value, the 2-4 brake sequence valve 8 is switched from the position for supplying the back pressure to the 2-4 brake accumulator 10 to the position for draining the accumulator 10. As a result, the oil pressure in the back pressure chamber of the 2-4 brake accumulator 10 is rapidly reduced, and the released pressure of the 2-4 brake pressure 2-4/B is rapidly reduced, thus avoiding interlocking when the pressure applied to the high clutch $P_{H/C}$ overlaps the pressure released from the 2-4 brake 2-4/B, thereby reducing a sudden drop in the torque TQ of the output shaft during the initial period of the inertia phase.

Where the engine racing occurs after the 2-4 brake sequence valve 8 is switched from the supply position to the drain position, an OFF command is temporarily generated to the 2-4/B timing solenoid 24, so that the 2-4/B timing valve 7 is temporarily switched from the position for applying the high clutch pressure $P_{H/C}$ to the 2-4 brake sequence valve 8, to the position for releasing the pressure $P_{H/C}$. As a result, only the accumulator back pressure is applied as an operating signal pressure to the 2-4 brake sequence valve 8, whereby the 2-4 brake sequence valve 8 is again temporarily switched to the position for supplying the back pressure to the 2-4 brake accumulator 10. With the oil pressure thus temporarily supplied to the back pressure chamber of the 2-4 brake accumulator 10, the engaging capacity of the 2-4 brake 2-4/B is temporarily increased, and the racing of the engine is thus prevented.

In the above arrangement, the timing of switching the 2-4 brake sequence valve 8 can be tuned with an increased degree of freedom, only taking account of reduction of shocks, since the control for preventing the racing of the engine can be accomplished by temporarily increasing the pressure to be released from the 2-4 brake 2-4/B.

The control for preventing the racing of the engine may be utilized in a negative manner and in a positive manner as described below.

As a method of utilizing the control for preventing the racing of the engine in a negative manner, a command may be generated to reduce the slope of a decrease in the duty ratio of the 2-4/B duty solenoid 24, so that the 2-4 brake sequence valve 8 is tuned to be switched at a point of time a little closer to the time of interlocking, thereby preventing the racing of the engine that would occur due to variations in the oil pressure and the torque of the output shaft.

As a method of utilizing the control for preventing the racing of the engine in a positive manner, a command may be generated to increase the slope of a decrease in the duty ratio of the 2-4/B duty solenoid 24, so that the 2-4 brake sequence valve 8 is tuned to be switched at a point of time just before the engine starts racing, thereby preventing the racing of the engine while alleviating shocks by reducing a sudden drop of the torque TQ of the output shaft.

In the present embodiment, the racing of the engine can be avoided both before and after switching of the 2-4 brake sequence valve 8, utilizing the control in which a command to drive the 2-4/B duty solenoid 24 with 100% duty ratio is generated so as to temporarily increase the accumulator back pressure, and the control in which an OFF command is generated to the 2-4/B timing solenoid 26 so as to temporarily supply the accumulator back pressure.

There will be described the manner of detecting the racing of the engine. During the 2nd-speed to 3rd-speed upshifting, the gear ratio of the transmission established in the 2nd-speed gear position is kept for a while in the initial period of shifting, and then gradually reduced to the gear ratio to be established in the 3rd-speed gear position, as long as the engine does not suffer from racing. Accordingly, the racing of the engine is detected when the actual gear ratio G represented by the count value is equal to or larger than the threshold value G0 set for determining racing of the engine, which value is obtained by adding 1 count value to the count value of the 2nd-speed gear ratio, namely, when the actual gear ratio G that is occasionally calculated is increased even a small amount during upshifting. In this manner, the racing of the engine can be detected immediate after it occurs, thus assuring the effect of the above-described control for preventing the engine racing.

(2) Applied Pressure Control

During the period of time represented by the second predetermined timer value T2, namely, the period from the start of upshifting to the start of the inertia phase, a command is generated to drive the line pressure duty solenoid 23 with a relatively low duty ratio, so that a relatively low accumulator control pressure (A) $P_{ACCMA}$ is supplied to the back pressure chamber of the high clutch accumulator 11. Therefore, the high clutch pressure $P_{H/C}$ is slowly increased up to the level of the accumulator back pressure after a lapse of the clutch piston stroke period, as indicated by the $P_{H/C}$ characteristic in FIG. 8.

During the period of time from the second predetermined timer value T2 to the timer value T4 representing completion of the shifting, the duty ratio of the line pressure duty solenoid 23 is gradually increased, so that a gradually increasing accumulator control pressure (A) $P_{ACCMA}$ is supplied to the back pressure chamber of the high clutch accumulator 11. As a result, the high clutch pressure $P_{H/C}$ increases at a gentle slope, as indicated by the $P_{H/C}$ characteristic in FIG. 8.

(3) Torque Down Control

In the inertia phase period during which the first predetermined gear ratio G1 is reduced down to the third predetermined gear ratio G3 to be established just before the end of the inertia phase, the control for reducing the engine torque is performed, so as to achieve sufficient reduction of the torque TQ of the output shaft in the inertia phase period.

The effects of the present embodiment will be described.

(1) The upshift control device of the present embodiment includes the 2-4 brake accumulator 10 provided in the oil path leading to the 2-4 brake 2-4/B to be released upon 2-3 upshifting, accumulator control valve (B) 4 adapted to produce an oil pressure applied to the back pressure chamber of the 2-4 brake accumulator 10, and the 2-4/B timing valve 7 that is switched between the position for supplying the oil pressure to the back pressure chamber of the 2-4 brake accumulator 10 and the position for removing the oil pressure from the back pressure chamber. In this arrangement, when the actual gear ratio G is determined to be equal to or larger than the threshold valve G0 set for determining racing of the engine, which value is obtained by adding 1 count value to the count value of the 2nd-speed gear ratio, the upshift control device generates an OFF command to the 2-4/B timing solenoid 26 for the predetermined time "t" so as to prevent racing of the engine. Thus, the racing of the engine can be effectively prevented by immediately increasing the back pressure of the accumulator for the engaging element (2-4 brake 2-4/B) to be released by 2-3 upshifting.

(2) The upshift control device also includes the high clutch accumulator 11 provided in the oil path to the high clutch H/C to be engaged upon 2-3 upshifting, and the 2-4 brake sequence valve 8 that is switched from the position for supplying the back pressure to the 2-4 brake accumulator 10 to the position for draining the accumulator 10 when a difference $\Delta P$ between the accumulator control pressure (A) $P_{ACCMA}$ and the high clutch pressure $P_{H/C}$ becomes equal to a predetermined value. The 2-4/B timing valve 7 selectively applies or removes the high clutch pressure $P_{H/C}$ as an operating signal pressure to or from the 2-4 brake sequence valve 8. In this arrangement, the timing for switching the 2-4 brake sequence valve 8 can be tuned with an increased degree of freedom, since the racing of the engine is prevented by increasing the back pressure of the 2-4 brake accumulator 10 as described above at (1).

(3) The engine racing preventive control means of the present embodiment generates a command to drive the 2-4/B duty solenoid 24 of the accumulator control valve (B) 4 with 100% duty ratio so as to temporarily increase the back pressure of the 2-4 brake accumulator 10 when the racing of the engine is detected after the 2-3 upshift command is generated, and also generates an OFF command to the 2-4/B timing solenoid 26 of the 2-4/B timing valve 7 so as to temporarily supply the accumulator back pressure to the back pressure chamber of the 2-4 brake accumulator 10. In this arrangement, the racing of the engine can be surely prevented due to the control for increasing or supplying the accumulator back pressure of the 2-4 brake 2-4/B to be released, irrespective of whether the engine racing occurs before or after switching of the 2-4 brake sequence valve 8 during 2-3 upshifting.

(4) The engine racing detecting means of the present embodiment detects racing of the engine when the actual or current gear ratio G represented by a count value becomes equal to or larger than the threshold valve G0 set for determining racing of the engine, which value is obtained by adding 1 count value to the count value of the 2nd-speed gear ratio. With this detecting means provided, the racing of the engine can be detected immediately after it occurs, thus ensuring the effect of the above-described control for preventing the engine racing.

Other Embodiments of the Invention

While the 2nd-speed to 3rd-speed upshifting has been described by way of example in the illustrated embodiment, the present invention is also applicable to 3rd-speed to 4th-speed upshifting in which the low clutch L/C is released and the 2-4 brake 2-4/B is engaged. In this case, the back pressure of the low clutch accumulator 9 is controlled by the low clutch sequence valve 6. The upshift control of the present invention is also applicable to 4th-speed to 5th-speed upshifting where the automatic transmission has five gear positions.

While the racing of the engine is detected by monitoring the gear ratio in the illustrated embodiment, the engine racing may be detected by monitoring the rotating speed of the engine or turbine runner during upshifting. It is also possible to detect the racing of the engine by monitoring the rotating speed of the output shaft of the transmission since torsion of the power train system is eliminated upon racing of the engine.

In the first embodiment as described above, the racing of the engine is prevented by employing two kinds of control operations, namely, control for temporarily supplying the accumulator back pressure that has been released, and control for increasing the accumulator back pressure that has been supplied. It is, however, possible to employ only one of the two kinds of control operations, that is, the control for temporarily supplying the accumulator back pressure that has been released.

Where both of the two kinds of control operations are employed, switching of the sequence valve may be detected by monitoring movement of the valve spool or change in the back pressure, for example, and the control for temporarily increasing the accumulator back pressure may be selected before switching of the sequence valve, while the control for temporarily supplying the accumulator back pressure may be selected after switching of the sequence valve.

What is claimed is:

1. An upshift control device for an automatic transmission of a motor vehicle wherein the transmission is shifted up to a first gear position to be established after upshifting, by releasing an oil pressure from a first engaging element that has been engaged in a second gear position established before upshifting while applying an oil pressure to a second engaging element that has been released in the second gear position, said upshift control device comprising:

a first accumulator provided in an oil path leading to the first engaging element that is to be released upon completion of upshifting;

an accumulator control valve for producing an oil pressure to be applied to a back pressure chamber of said first accumulator;

a timing valve that is switched between a position to allow the oil pressure to be supplied to said back pressure chamber of said first accumulator, and a position to remove the oil pressure from the back pressure chamber;

upshift determining means for determining whether an upshift command to shift up the transmission is generated;

engine racing detecting means for detecting racing of an engine of the vehicle during upshifting; and engine racing preventive control means for generating to an actuator of said timing valve a command to temporarily supply the oil pressure to said back pressure chamber of said first accumulator from which the pressure has been released, when said engine racing detecting means detects racing of the engine after the upshift command is generated.

2. An upshift control device according to claim 1, further comprising:

a second accumulator provided in an oil path leading to the second engaging element that is to be engaged upon completion of upshifting; and a sequence valve provided between said first accumulator and said accumulator control valve, said sequence valve being switched from a supply position for supplying the oil pressure to said back pressure chamber of said first accumulator, to a drain position for draining the back pressure chamber when a difference between a pressure of the first or second accumulator and a pressure to be applied to the second engaging element as operating signal pressures becomes equal to a predetermined value, wherein said timing valve is switched between a first position in which the pressure to be applied to the second engaging element is applied as an operating signal pressure to said sequence valve, and a second position in which the pressure to be applied to the second engaging element is inhibited from being applied to the sequence valve.

3. An upshift control device according to claim 2, wherein said engine racing preventive control means generates to a valve actuator of said accumulator control valve a command to temporarily increase the pressure in said back pressure chamber of said first accumulator, and generates to an actuator of said timing valve a command to temporarily supply the oil pressure to said back pressure chamber of said first accumulator, when said engine racing detecting means detects racing of the engine after the upshift command is generated.

4. An upshift control device according to claim 1, wherein said engine racing detecting means detects racing of the engine when a gear ratio of the automatic transmission which is occasionally calculated during upshifting becomes larger than an initial gear ratio established when the upshift command is generated.

* * * * *